United States Patent [19]

van Drumpt

[11] 4,322,273
[45] Mar. 30, 1982

[54] PROCESS FOR CROSS-LINKING SHAPED NON-POLAR SYNTHETIC RESINS AND ELECTRICAL INSULATION CONTAINING SUCH RESINS

[75] Inventor: Jan D. van Drumpt, Deventer, Netherlands

[73] Assignee: Akzona Incorporated, Asheville, N.C.

[21] Appl. No.: 70,124

[22] Filed: Aug. 27, 1979

[30] Foreign Application Priority Data

Aug. 31, 1978 [NL] Netherlands ................... 7808931

[51] Int. Cl.$^3$ ............................................. C08F 2/52
[52] U.S. Cl. .................................. 204/165; 204/168; 525/387
[58] Field of Search .................. 204/165, 168, 169; 525/387

[56] References Cited

U.S. PATENT DOCUMENTS

| 2,862,905 | 12/1958 | Banes et al. | 525/387 |
| 3,432,413 | 3/1969 | Vanderhoff | 204/168 X |
| 3,640,913 | 2/1972 | Cerra | 204/165 X |
| 3,654,315 | 4/1972 | Chang et al. | 260/343.3 |
| 3,825,510 | 7/1974 | Yamamoto et al. | 525/387 X |

FOREIGN PATENT DOCUMENTS

| 2611349 | 9/1977 | Fed. Rep. of Germany | 204/165 |
| 956808 | 4/1964 | United Kingdom . | |
| 1182703 | 3/1970 | United Kingdom . | |
| 1276758 | 6/1972 | United Kingdom . | |

*Primary Examiner*—F. Edmundson
*Attorney, Agent, or Firm*—Francis W. Young; Robert F. Green; Clelle W. Upchurch

[57] ABSTRACT

A non-polar synthetic resin is mixed with an organic peroxide and cross-linked with a high frequency alternating current field. The peroxide is a perketal or perester of the formula 1, 1a, 2, 3, 4 or 5 of the drawing. The cross-linked resin is useful for the insulation of an electrical conductor.

13 Claims, 9 Drawing Figures

(1)
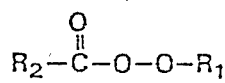
(1a)
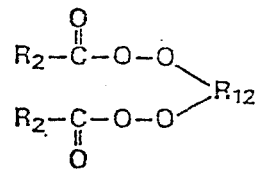
(2)
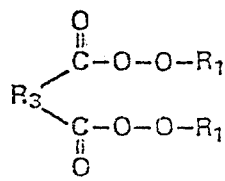
(3)
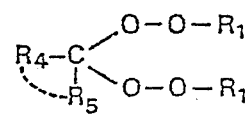
(4)
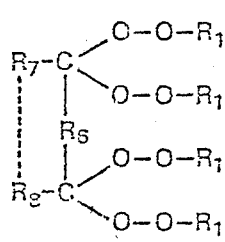
(5)
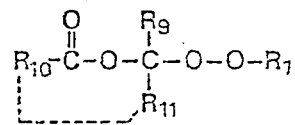

(6)
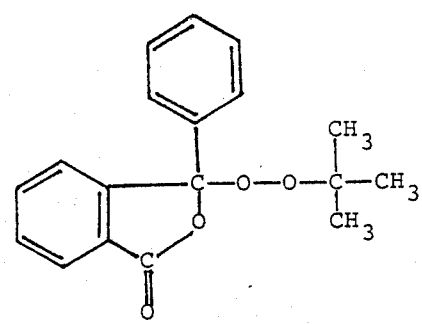
(7)
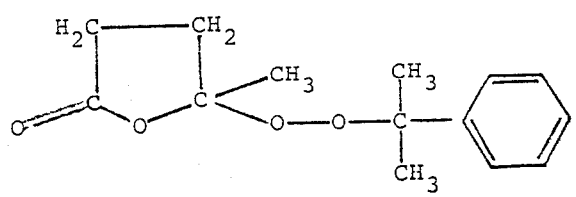
(8)
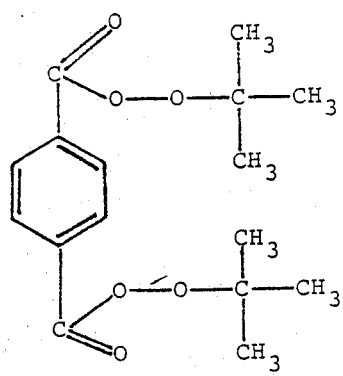

PROCESS FOR CROSS-LINKING SHAPED NON-POLAR SYNTHETIC RESINS AND ELECTRICAL INSULATION CONTAINING SUCH RESINS

This invention relates to a process for cross-linking shaped non-polar synthetic resins by exposing them to a high frequency alternating current field in the presence of a polar peroxide and in the absence of a polar auxiliary substance.

A process of the type indicated above is known from the published German Patent Application DE-OS No. 2 611 349. According to the process described in the application, compounds that are unstable in a high frequency alternating current field are used, such as, for example, peroxides and azo compounds which are sufficiently polar to decompose into radicals in a high frequency alternating field or, if they are not unstable, decompose into radicals in the presence of an auxiliary substance which is activated by an alternating current field. In the publication, no specific peroxides, azo compounds or auxiliary substances are mentioned. Applicant has found that in the absence of an auxiliary substance which in itself is undesirable, acceptable results can be obtained only with the use of very special polar peroxides, other peroxides being unsuitable for use in actual practice. Polarity is a necessity but by no means the only requirement. Not only the symmetrical peroxides such as dicumyl peroxide and ditertiary butyl peroxide are, as was to be expected, inactive, but there are also polar peroxides which do not give satisfactory results.

The use of such polar peroxides, even in relatively large amounts, such as the following peroxides does not result in cross-linking at all or only to a quite insufficient degree:
 bis(tert. butyl peroxy isopropyl) benzene;
 tert. butyl hydroperoxide;
 tert. butyl cumyl peroxide;
 cumene hydroperoxide;
 mono tert. butyl peroxy maleinate;
 4-tert.butyl peroxy-4-methyl-2-pentanone;
 cumyl peroxy trimethyl silane;
 tert. butyl peroxy-stearyl carbonate;
 tert. butylperoxy-cetyl carbonate;
 2,2-bis cumylperoxy-propane;
 2,2-bis (4,4-di-t. butylperoxy-cyclohexyl) propane;
 1-ethyl carboxymethylene-1,4,4',7,7'-pentamethyl-2,3,8,9-tetraoxacyclononane.

Other polar peroxides result in cross-linking, but they are unsuitable for use because they become active in the initial shaping stage and cause the polymer to be cross-linked before it is in its final form, so that it becomes unprocessable (scorching). Examples thereof include:
 tert.butyl peroxy p-methoxybenzoate;
 tert.butyl peroxy (2,2-diethyl)acetate;
 tert.butyl peroxy 2-ethyl hexanoate;
 cumylperoxy hexahydrobenzoate;
 dicumyl peroxy hexahydroterephthalate; and
 tert. butyl peroxy pivalate.

There are also polar peroxides which during cross-linking emit a substantial amount of gas, which is occluded in the material so that the material becomes unsuitable for electrical insulation purposes. Examples thereof include:
 tert.butyl peroxy (2,2diethyl)acetate;
 cumyl perbenzoate; and
 cumyl percaprylate.

It is an object of this invention to provide a process for cross-linking non-polar synthetic resins by exposure to a high frequency alternating field which is devoid of the above disadvantages. Another object of the invention is to provide an improved process for cross-linking non-polar synthetic resins by exposure to a high frequency field and a polar peroxide. Still another object of the invention is to provide a process for cross-linking a nonpolar synthetic resin with a high frequency alternating current field in the presence of a selected polar peroxide which does not generate a significant amount of gas.

The foregoing objects and others are accomplished in accordance with this invention, generally speaking, by providing a process for cross-linking a synthetic resin wherein a cross-linkable non-polar synthetic resin mixed with a polar peroxide is exposed to a high frequency alternating current field until the resin is cross-linked. The peroxide may be one or more of the following:

A: peresters of the general formula 1, 1a or 2 shown in the accompanying drawing;
B: perketals of the general formula 3 or 4 shown in the accompanying drawing;
C: peroxides of the general formula 5 shown in the accompanying drawing;

where
$R_1$ is a tertiary alkyl group having 4–12 carbon atoms; and when the peroxide has formula (5) of the enclosed drawing a tertiary alkyl group having 4–12 carbon atoms or a tertiary aralkyl group having 7–12 carbon atoms.

$R_2$ is a primary alkyl group having 1–12 carbon atoms, or an aryl group having 7–12 carbon atoms and substituted with one or more methyl groups; or when the peroxide has formula 1a of the drawing, $R_2$ may be a phenyl group;

$R_3$ is a primary alkylene group having 1–12 carbon atoms, a vinylidene group or a phenylene group;

$R_4$ and $R_5$ are primary alkyl groups having 1–12 carbon atoms or together with the adjacent carbon atom form part of a cyclopentamethylene group or cyclohexamethylene group which may or may not be methyl-substituted;

$R_6$ is a diprimary alkylene group having 1–12 carbon atoms or together with the adjacent carbon atoms and $R_7$ and $R_8$ form part of a cyclo-pentamethylene group or cyclo-hexamethylene group which may or may not be methyl-substituted;

$R_7$ and $R_8$ are primary alkyl groups having 1–12 carbon atoms or together with the adjacent carbon atoms and $R_6$ form part of a cyclopentamethylene group or cyclohexamethylene group which may or may not be methyl-substituted;

$R_9$ is a methyl group or phenyl group;

$R_{10}$ and $R_{11}$ are primary alkyl groups having 1–12 carbon atoms, cyclopentyl groups or cyclohexyl groups, aryl groups or together and along with the adjacent

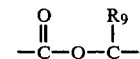

group form part of a substituted or unsubstituted ring system having 5 or 6 atoms in the ring; and $R_{12}$ is a ditert. alkylene group having 8-12 carbon atoms.

The foregoing $R_1$ through $R_{12}$ are shown in the formulae on the accompanying drawing.

If one of these peroxides is used, the above drawbacks are not experienced and products having excellent properties are obtained.

The process according to the invention is especially of importance for the manufacture of insulated electrical articles, for example, electric wires or cables.

Electrical conductors are generally insulated with polymers and copolymers of olefins such as ethylene. Because of their non-polar character these polymers are especially suitable for use as electrical insulating material, but they do not readily cross-link in a high frequency alternating current field in the presence of the usual radical initiators because the polymer is not heated by the field. For that reason, as appears from the Netherlands patent application NL No. 274,239 and the German Patent Application DE-05 No. 2,611,349, polar substances (such as carbon black) which absorb energy from the high frequency alternating current field, are sometimes added to these polymers, which substances heat the polymer and thus indirectly activate the radical initiators. In that way, the polymers are artifically polarized, which is inadmissible for electrical insulation purposes in the intermediate and in the high voltage range.

In practice, for the purpose of cross-linking the polymers, electrical articles such as cables insulated with such polymers are, upon being shaped, heated to a temperature at which the radical initiators present in the polymer are activated and hence caused to bring about cross-linking. To that end, the cables are passed through very long ovens in which they are heated to the desired temperature with the aid of steam under pressure. This method of cross-linking not only has the disadvantage that it is costly because of the very intricate technology, but also the cables become damp because of the use of steam. Moreover, there is the side effect that closed voids are formed. In the process according to the invention, the polymer provided with a coating (containing the peroxide) is passed through ovens in which a high frequency alternating current field is maintained by which the polymer is cross-linked. The length of these ovens is much shorter than that of the ones that are commonly employed. The electrical properties of the products provided by the invention compare with those of the best products obtained by the prior art processes. A particularly suitable compound is di-tert. butyl peroxy terephthalate (formula 8). Also very suitable compounds having the general formula (5) of the drawing such as 2-methyl-2-cumylperoxy-5-ketotetra-hydrofuran (formula 7) and 3-phenyl-3 tert. butyl-peroxy-phthalide (formula 6). These compounds and their preparation are described in U.S. Pat. No. 3,654,315.

The amount of polar peroxide to be used may vary within wide limits. In general, excellent results are obtained with an amount of 5 percent by weight, although often good results may be obtained with the use of smaller amounts. High frequency alternating current fields are known in the art and the apparatus for creating them is commercially available. The frequency of a suitable field may be for instance: 434, 915 or 2450 MHz.

The process according to the invention also may be applied successfully to cross-link nonelectrical articles of manufacture.

The process is particularly advantageous for cross-linking articles having a thick wall because in that case the prior art heating methods other than by high frequency fields as contemplated herein give rise to nonhomogeneous increases in temperature in the articles.

In addition to the novel process provided by the invention, the products of the process are contemplated.

The invention will be further described in the following examples.

EXAMPLES 1-23

The peroxides listed below as Nos. 1-23 are mixed with polyethylene powder (Alkathene 017040, registered trade mark of ICI) on a two-roll mill in Examples 1-23, respectively, at a temperature of 120° C. About 200 grams of the mixture is immediately afterwards exposed for 5 minutes to high frequency radiation of 2450 Mhz (1000 W). In all cases, the degree of cross-linking is measured both before and after radiation by extraction for 6 hours with boiling xylene. The results are given as the weight fraction of non-extracted (=cross-linked) polymer (gel fraction). Results acceptable for practical purposes are obtained if more than about 60% of the material is not extracted.

In this way, the following peroxides were examined for their effectiveness. The trade name under which the peroxide is marketed by Akzo Chemie b.v., Stationsstraat 48, Amersfoort, The Netherlands, is given in brackets and the representative general formula is shown on the drawing.

1. dicumyl peroxide (Perkadox SB);
2. tert. butyl cumyl peroxide (Trignonox T);
3. tert. butyl hydroperoxide (Trigonox A);
4. cumyl hydroperoxide (Trigonox K);
5. tert. butylperoxy-(p. methoxy) benzoate;
6. tert. buylperoxy-(2,2-diethyl)acetate (Trigonox 27);
7. cumyl perbenzoate;
8. cumyl percaprylate;
9. 2,2-bis (4,4-di-tert. butylperoxy-cyclohexyl) propane (Perkadox 12);
10. 2,2-biscumylperoxy-propane;
11. tert. buylperoxy-stearyl carbonate;
12. tert. butylperoxy-cetyl carbonate;
13. mono-tert. buylperoxy-maleinate;
14. 1-ethyl carbomethylene-1,4,4',7,7'-penta-methyl-2,3,8,9-tetraoxacyclononane;
15. 4-tert. butylperoxy-4-methyl pentanone-2;
16. 2,5-di-tert. butylperoxy-2,5-dimethyl-tetrahydrofuran;
17. cumylperoxy-trimethylsilan;
18. tert. butylperoxy-3,5,5-trimethyl hexanoate (Trigonox 42S, formula 1);
19. 2,5-dibenzoylperoxy-2,5-dimethyl hexane (formula 1a);
20. di-tert. butylperoxy terephthalate (formula 2 and 8);
21. 1,1-di-t-butyl peroxy-3,5,5-trimethyl-cyclohexane (Trigonox 29, formula 3);
22. 2-methyl 2-cumyl peroxy 5-ketotetrahydrofuran (formula 5 and 7);
23. 3-tert. butylperoxy-3-phenylphthalide (formula 5 and 6).

The results are given in the following Table I-III. In all cases, the amount of peroxide was 5% by weight.

Experiments leading to results which were unacceptable for practical purposes are shown in the Tables I and II. In these experiments use was made of the above peroxides 1-17 which are not peroxides according to the invention.

TABLE I

| Experiments with peroxide | gel fraction % radiation before | after | Observations |
|---|---|---|---|
| 1 | 0 | 0 | no cross-linking |
| 2 | 0 | 0 | no cross-linking |
| 3 | 0 | 0 | no cross-linking |
| 4 | 0 | 0 | no cross-linking |
| 5 | 45 | 95 | cross-linking even before radiation |
| 6 | 40 | 40 | cross-linking and occlusion of gas bubbles even before radiation |
| 7 | 0 | 73 | much occlusion of gas |
| 8 | 0 | 54 | occlusion of gas and insufficient cross-linking |
| 9 | 0 | 8 | hardly any cross-linking |
| 10 | 0 | 0 | no cross-linking |
| 11 | 0 | 16 | insufficient cross-linking |
| 12 | 0 | 29 | insufficient cross-linking |

TABLE II

| Experiments with peroxide | Results |
|---|---|
| 13 | hardly any cross-linking |
| 14 | no cross-linking |
| 15 | hardly any cross-linking |
| 16 | too little cross-linking |
| 17 | no cross-linking |

Experiments according to the invention leading to results acceptable for practical purposes.

TABLE III

| Experiments with peroxide | gel fraction (%) radiation before | after | Observations |
|---|---|---|---|
| 18 | 0 | 70 | |
| 19 | 0 | 65 | |
| 20 | 0 | 95 | over curing |
| 21 | 0 | 60 | little rise in temperature |
| 22 | 0 | 83 | |
| 23 | 0 | 98 | over curing |

EXAMPLES 24-26

The above experiments are repeated with di-t-butyl peroxy terephthalate (20), 2-methyl 2-cumylperoxy -5-ketotetrahydrofuran (22) and 3-tert. butylperoxy-3-phenylphthalide (23), but in such a way that these peroxides were added in an amount of only 2 or 3% by weight.

| Experiments with peroxide | wt. % peroxide | gel fraction (%) radiation before | after |
|---|---|---|---|
| 20 | 2 | 0 | 65 |
| 22 | 3 | 0 | 60 |
| 23 | 2 | 0 | 73 |

These examples show that a satisfactory degree of cross-linking also can be obtained when use is made of small amounts of peroxide. The use of small amounts of peroxide is, of course, attractive for economic reasons, but it has the additional advantage that in the cross-linked polymer only very little foreign substance is left, which has a particularly favorable effect on the electrical properties.

EXAMPLE 27

On a two-roll mill, over a period of 3 minutes and at 100° C., 3-t-butylperoxy-3-phenylphthalide (23) was mixed with EPDM rubber (Keltan 520, registered trade mark of the Company of DSM, Koestraat, Geleen, The Netherlands). The mixture contained 2% by weight of peroxide. Of this mixture, 200 grams were immediately afterwards exposed for 5 minutes to high frequency radiation of 2450 MHz (1000 W). The degree of cross-linking was determined in the same way as described above for polyethylene. After radiation, the degree of cross-linking was found to be 85%. This example demonstrates that when use is made of ethylene-propylene terpolymers instead of polyethylene favorable results may be obtained.

Although the invention has been described in detail for the purposes of illustration, it is to be understood that such detail is solely for that purpose and that variations can be made therein without departing from the spirit and scope of the invention except as it may be limited by the claims.

What is claimed is:

1. In the cross-linking of a non-polar synthetic resin by a process which comprises exposing the resin to high frequency alternating current radiation while the resin is mixed with a polar peroxide, the improved process which comprises exposing said resin to said radiation while the resin contains a polar peroxide selected from the group consisting of (A) a perester of the formula

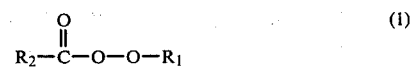

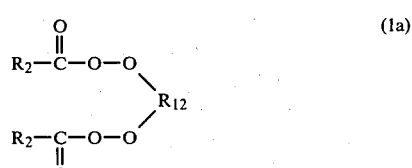

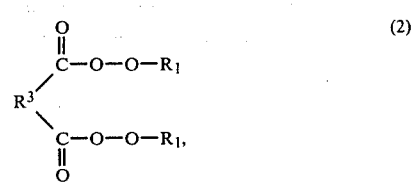

(B) a perketal of the formula;

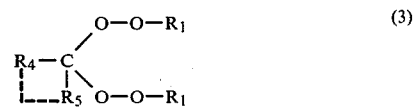

-continued

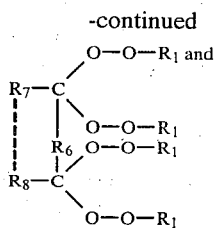

(C) a peroxide of the formula

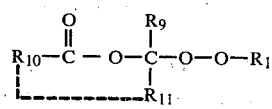 (5)

$R_1$ is a tertiary alkyl group having 4–12 carbon atoms; and in the case of peroxides of the formula 5, a tertiary alkyl group having 4–12 carbon atoms or a tertiary aralkyl group having 7–12 carbon atoms;

$R_2$ is a primary alkyl group having 1–12 carbon atoms or, an aryl group having 7–12 carbon atoms and substituted with one or more methyl groups; and where the peroxide has the formula 1a, $R_2$ is a phenyl group;

$R_3$ is a primary alkylene group having 1–12 carbon atoms, a vinylidene group or a phenylene group;

$R_4$ and $R_5$ are primary alkyl groups having 1–12 carbon atoms or together with the adjacent carbon atom form part of a cyclopentamethylene group or cyclohexamethylene group which may or may not be methyl-substituted;

$R_6$ is a diprimary alkylene group having 1–12 carbon atoms or together with the adjacent carbon atoms and $R_7$ and $R_8$ form part of a cyclopentamethylene group or cyclohexamethylene group which may be methyl-substituted;

$R_7$ and $R_8$ are primary alkyl groups having 1–12 carbon atoms or together with the adjacent carbon atoms and $R_6$ forming part of a cyclopentamethylene group or cyclohexamethylene group which may be methyl-substituted;

$R_9$ is a methyl or phenyl group;

$R_{10}$ and $R_{11}$ are primary alkyl groups having 1–12 carbon atoms, cyclopentyl groups or cyclohexyl groups, aryl groups or together with the adjacent

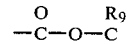

group form part of a substituted or unsubstituted ring system having 5 or 6 atoms in the ring; and $R_{12}$ is ditert. alkylene group having 8–12 carbon atoms, said resin being substantially free from a second polar substance added thereto to promote decomposition of the peroxide into radicals, whereby said resin is cross-linked without significant gas occlusion in the resulting cross-linked resin.

2. The process of claim 1, characterized in that the peroxide is di-tert.butylperoxyterephthalate (formula 8).

3. The process of claim 1, characterized in that use is made of 2-methyl-2-cumylperoxy-5-ketotetrahydrofuran (formula 7).

4. The process of claim 1, characterized in that the peroxide is 3-t-butylperoxy-3-phenyl phthalide (formula 6).

5. An electrical article insulated with a cross-linked nonpolar synthetic resin prepared by the process of claim 1.

6. The process of claim 1 wherein the resin is a polymer or copolymer of olefins.

7. The process of claim 6 wherein the resin is a polymer or copolymer of ethylene.

8. The process for cross-linking the non-polar synthetic resin of claim 1 wherein said resin is contained in a composition which electrically insulates an electrical conductor which composition is substantially free of a polar substance which absorbs energy from a high frequency alternating current field and heats the composition, said process comprising mixing with the composition said polar organic peroxide and radiating the resulting mixture with a high frequency alternating current field to decompose the peroxide into radicals which initiate cross-linking of the said synthetic resin and continuing the radiation until the said synthetic resin is cross-linked.

9. The process of claim 8 wherein the synthetic resin is a polymer or copolymer of an olefin and the composition is an insulating coating on an electrical conductor when the composition is radiated.

10. The process of claim 9 wherein the peroxide is 2-methyl-2-cumylperoxy-5-ketotetrahydrofuran.

11. The process of claim 9 wherein the peroxide is 3-t-butylperoxy-3-phenyl phthalide.

12. The process of claim 9 wherein the peroxide is di-tert.butylperoxyterephthalate.

13. The process of claim 8, 9, 10, 11, or 12 wherein the said frequency is from 434 to 2450 MHz.

* * * * *